UNITED STATES PATENT OFFICE.

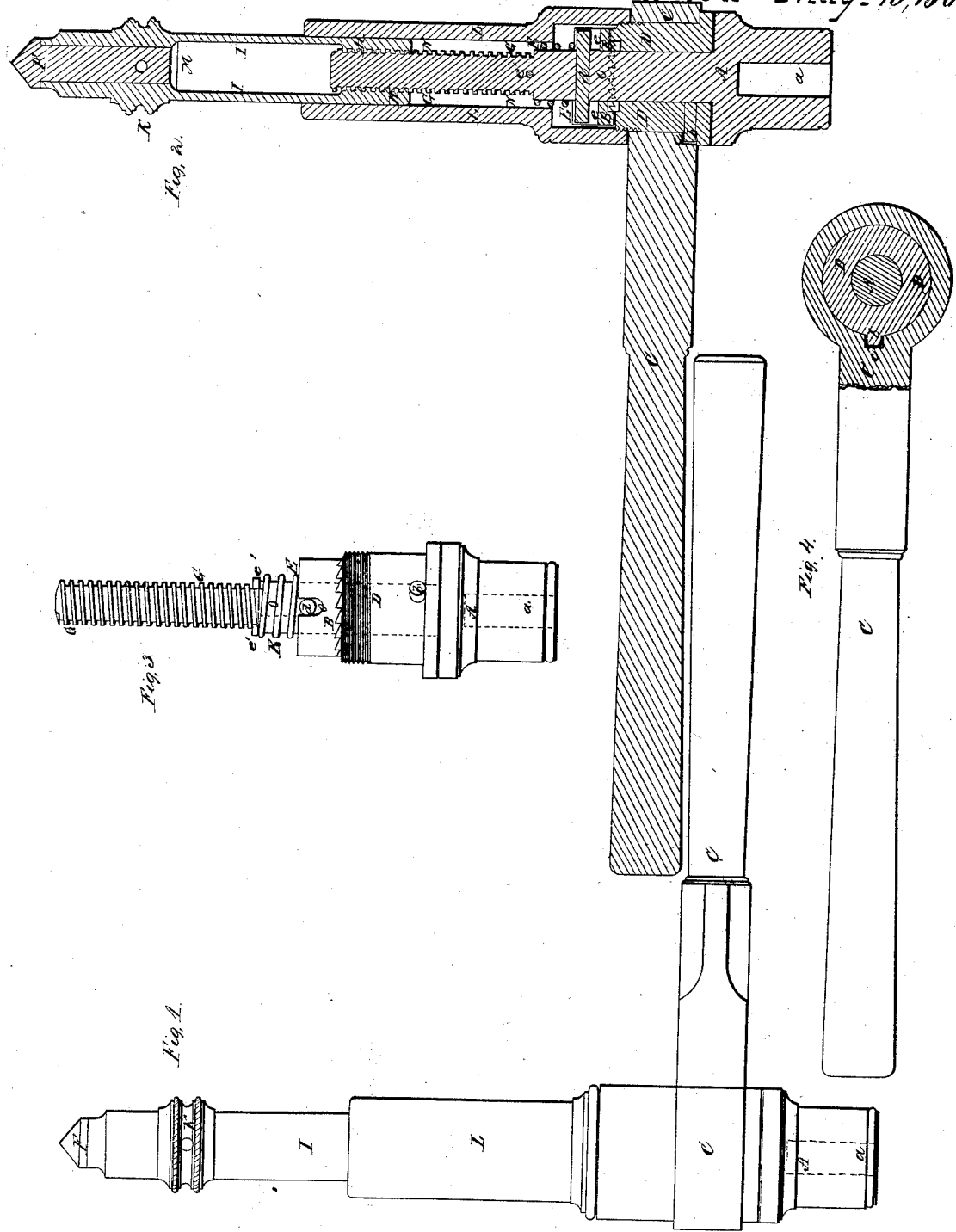

JAMES H. PARKER, OF BOSTON, MASSACHUSETTS, ASSIGNOR TO E. H. ASHCROFT, OF SAME PLACE.

HAND-DRILL.

Specification of Letters Patent No. 28,327, dated May 15, 1860.

*To all whom it may concern:*

Be it known that I, JAMES H. PARKER, of Boston, in the county of Suffolk and State of Massachusetts, have invented an Improved Hand-Drill or Rotary Drill-Stock; and do hereby declare that the same is fully described and represented in the following specification and the accompanying drawings, of which—

Figure 1, is an external elevation, and Fig. 2, a longitudinal section of the same. Fig. 3, is a side view of the drill carrier its clutch and male screw, when separated from the working lever, the cap sleeve and the pivot screw to be hereinafter described. Fig. 4, is a transverse section of the drill stock taken through the said working lever.

In such drawings, A, denotes the drill carrier as provided with a socket $a$, for the reception of the head of a drill or boring tool and constructed with a shank $o$, which is cylindrical and receives the two toothed parts B, D, of a spring clutch. The part D, should be applied to the shank O, in such manner as to be capable of being freely revolved thereon. The said part D, passes through and is embraced by the hand lever C, and connected with such by means of a pin or projection $b$, extended from the part D, into a corresponding socket, $c$, made in the said lever. The upper end of the part D, is constructed with ratchet teeth to match with similar teeth applied to the lower end of the part B, which should be so adapted to the shank O, as to be capable of being moved longitudinally thereon without being able to turn around upon the said shaft. To this end, a pin $d$, is extended through the shank, O, and projected a short distance from opposite sides of the same and into recesses, $e, e$, formed in the part, B, one of which is shown in Fig. 3. A helical spring E, envelops the shank, O, and bears against the part B, and a pin, $e'$, extended through the shank, the said spring serving to maintain the parts of the clutch in engagement, or in other words, to press the part, B, down upon the part D, in such manner, that by moving the lever C, in one direction in a plane at right angles to the axis of the carrier A, the parts of the clutch will be caused to so engage with one another that the carrier, A, and its screw, G, will at the same time be put in rotary motion. The backward movement of the lever C, will cause the part D, to turn freely on the shank, O, without producing any rotary movement of the carrier, A. Thus, it will be perceived that intermittent rotary motion of the drill carrier will be produced by a reciprocating motion of the hand lever C, and the part D, the shank O, being the fulcrum of the lever. Furthermore, the said carrier is provided with a separate bearing pivot, F,—which is applied by means of male and female screws G, and H, or as hereinafter described.

The male screw G, is extended directly upward from the shank of the carrier and in line with its axis and works in the female screw H, arranged at the lower part of a tubular shank, I, which supports the bearing pivot, F, and is provided with a milled handle K, arranged near to the pivot as shown in the drawings.

The hollow shank, I, as well as the screw G, and all that part of the clutch which is above the handle or lever C, is encompassed by a tubular cap or oil holder, L, that is screwed upon the part, D, of the clutch and has on that portion of it which receives the shank, I, an internal diameter corresponding with or being a very little greater than the external diameter of the said shank.

The screws G, and H, are feeding screws, that is, they serve to advance the drill during its rotary motion with its carrier.

By arranging the clutch with respect to the drill carrier, A, and the lever, C, as described and covering the clutch, the screw G, and the shank I, by the tubular sleeve or cap L, as hereinbefore specified, we are enabled to protect from dust, chips, borings or extraneous matters the working surfaces of the clutch as well as those of the screws or those to which oil is required to be applied, and furthermore the teeth of the clutch are so covered as to be protected from injury from accidental blows or falls of the apparatus against any hard substance. Thus, when oil is in the chamber N, which surrounds the screw G, it will not only lubricate the screws G, and H, but the working parts of the clutch and that portion of the shank O, which may be considered as the fulcrum of the lever C.

I do not claim the combination of two cylindrical shells with the feed screws and other parts of a hand drill as represented and claimed in the United States Patent No. 20,728; nor do I claim extending the male feeding screw, G, directly upward from the drill carried and within a cup or sleeve L, so as to form an oil reservoir about such screw, the female screw H, being applied to a tubular shank I, carrying the pivot F, as described.

I claim—

The arrangement of the spring clutch with the drill carrier and its lever and within and so as to be protected by the sleeve or cap L, substantially as hereinbefore specified.

JAMES H. PARKER.

Witnesses:
ARTHUR NEILL,
F. P. HALE, Jr.